United States Patent
Tauser et al.

(10) Patent No.: US 7,218,443 B2
(45) Date of Patent: May 15, 2007

(54) GENERATION OF TUNABLE LIGHT PULSES

(75) Inventors: Florian Tauser, München (DE); Alfred Leitenstorfer, Constance (DE)

(73) Assignee: Toptica Photonics AG, Planegg/Martinsried (DE)

( * ) Notice: Subject to any disclaimer, the term of this patent is extended or adjusted under 35 U.S.C. 154(b) by 0 days.

(21) Appl. No.: 10/787,001

(22) Filed: Feb. 25, 2004

(65) Prior Publication Data

US 2004/0207905 A1 Oct. 21, 2004

(30) Foreign Application Priority Data

Feb. 25, 2003 (DE) ................. 103 08 249
Feb. 23, 2004 (DE) ............. 10 2004 009 066

(51) Int. Cl.
*H01S 3/08* (2006.01)
*H04B 10/18* (2006.01)

(52) U.S. Cl. ............... 359/337.5; 372/93; 372/100; 372/6; 372/20

(58) Field of Classification Search ........... 359/337.4, 359/6; 372/20
See application file for complete search history.

(56) References Cited

U.S. PATENT DOCUMENTS

| | | | |
|---|---|---|---|
| 3,743,965 A * | 7/1973 | Offner ................... 372/20 |
| 4,063,106 A * | 12/1977 | Ashkin et al. .......... 359/327 |
| 4,815,080 A * | 3/1989 | Chesnoy et al. ........ 372/30 |
| 5,017,806 A * | 5/1991 | Edelstein et al. ....... 359/330 |
| 5,034,951 A * | 7/1991 | Edelstein et al. ....... 372/22 |
| 5,097,471 A * | 3/1992 | Negus et al. ........... 372/18 |
| 5,163,059 A * | 11/1992 | Negus et al. ........... 372/18 |
| 5,173,908 A * | 12/1992 | Negus et al. ........... 372/18 |
| 5,235,605 A * | 8/1993 | Rines et al. ............ 372/20 |
| 5,265,109 A * | 11/1993 | Knox .................... 372/18 |
| 5,296,960 A * | 3/1994 | Ellingson et al. ....... 359/330 |
| 5,371,752 A * | 12/1994 | Powers et al. .......... 372/25 |
| 5,400,350 A * | 3/1995 | Galvanauskas ......... 372/20 |
| 5,406,408 A * | 4/1995 | Ellingson et al. ....... 359/330 |
| 5,434,873 A * | 7/1995 | Delfyett, Jr. ........... 372/18 |
| 5,499,134 A | 3/1996 | Galvanauskas et al. |
| 5,550,850 A * | 8/1996 | Lee et al. .............. 372/16 |
| 5,579,152 A * | 11/1996 | Ellingson et al. ....... 359/330 |
| 5,701,320 A * | 12/1997 | Sugiyama et al. ...... 372/32 |
| 5,764,662 A * | 6/1998 | Pinto .................... 372/20 |

(Continued)

FOREIGN PATENT DOCUMENTS

EP 1 118 904 7/2001

OTHER PUBLICATIONS

Polarization-Maintaining Photonic Crystal Fiber Products. Crystal Fibre Corperation. www.crystal-fibre.com/products/pm.shtm. DLed on: Oct. 7, 2005.*

(Continued)

*Primary Examiner*—Jack Keith
*Assistant Examiner*—Ari M. Diacou
(74) *Attorney, Agent, or Firm*—Collard & Roe, P.C.

(57) ABSTRACT

A device for generating tunable light pulses has a non-linear optical fiber. The optical spectrum of femtosecond light pulses can be modified by this optical fiber, taking advantage of solitonic effects. In order to make available such a device, which makes it possible to vary the pulse energy and the wavelength of the light pulses independently of one another, an optical compressor precedes the non-linear optical fiber.

10 Claims, 1 Drawing Sheet

U.S. PATENT DOCUMENTS

| | | | |
|---|---|---|---|
| 5,799,025 A * | 8/1998 | Lai et al. ................ | 372/18 |
| 5,835,512 A * | 11/1998 | Wada et al. ............ | 372/13 |
| 5,880,877 A | 3/1999 | Fermann et al. | |
| 5,936,981 A * | 8/1999 | Wada et al. ............ | 372/13 |
| 5,953,154 A * | 9/1999 | Akagawa et al. ....... | 359/330 |
| 6,038,239 A * | 3/2000 | Gabbert .................. | 372/20 |
| 6,044,094 A * | 3/2000 | Govorkov ............... | 372/21 |
| 6,246,707 B1 * | 6/2001 | Yin et al. ............... | 372/25 |
| 6,272,156 B1 * | 8/2001 | Reed et al. ............. | 372/25 |
| 6,393,037 B1 * | 5/2002 | Basting et al. ......... | 372/20 |
| 6,466,604 B1 * | 10/2002 | Kopf ...................... | 372/99 |
| 6,570,704 B2 * | 5/2003 | Palese .................... | 359/349 |
| 6,594,301 B2 * | 7/2003 | Pang ...................... | 372/100 |
| 6,603,600 B2 * | 8/2003 | Pang ...................... | 359/348 |
| 6,614,828 B1 * | 9/2003 | Basting et al. ......... | 372/100 |
| 6,618,531 B1 | 9/2003 | Goto et al. | |
| 6,671,294 B2 * | 12/2003 | Kroyan et al. .......... | 372/20 |
| 6,915,030 B2 * | 7/2005 | Svilans et al. .......... | 385/14 |
| 6,940,879 B2 * | 9/2005 | Zhang .................... | 372/20 |
| 6,980,573 B2 * | 12/2005 | Korn ....................... | 372/20 |
| 2001/0021215 A1 * | 9/2001 | Bunting et al. ......... | 372/70 |
| 2002/0012374 A1 * | 1/2002 | Basting et al. ......... | 372/55 |
| 2002/0131737 A1 * | 9/2002 | Broeng et al. .......... | 385/123 |
| 2002/0136245 A1 * | 9/2002 | Pang ...................... | 372/20 |
| 2003/0012234 A1 * | 1/2003 | Watson et al. .......... | 372/25 |
| 2003/0025917 A1 * | 2/2003 | Suhami .................. | 356/601 |
| 2003/0031216 A1 * | 2/2003 | Fallon et al. ........... | 372/29.01 |
| 2003/0156605 A1 * | 8/2003 | Richardson et al. .... | 372/25 |
| 2004/0000942 A1 * | 1/2004 | Kapteyn et al. ........ | 327/306 |
| 2004/0047387 A1 * | 3/2004 | Bunting et al. ......... | 372/70 |
| 2004/0109487 A1 * | 6/2004 | Zhang .................... | 372/97 |
| 2004/0165641 A1 * | 8/2004 | Garnache et al. ....... | 372/97 |
| 2004/0190847 A1 * | 9/2004 | Bickham et al. ........ | 385/127 |
| 2005/0046914 A1 * | 3/2005 | Gruhlke ................. | 359/1 |
| 2005/0129072 A1 * | 6/2005 | Tayebati et al. ........ | 372/9 |
| 2005/0213632 A1 * | 9/2005 | Nebendahl ............. | 372/94 |

OTHER PUBLICATIONS

Jonathan Knight. Photonic crystal fibers. Nature. vol. 424. Aug. 14, 2003. pp. 847-851.*

Limpert et al. 500 W continuous wave fibre laser with excellent beam quality. Elec. Lett. Apr. 17, 2003. vol. 39, No. 8. pp. 645-647.*

Wadsworth et al. High power air-clad photonic crystal fiber laser. Opt. Expr. vol. 11, No. 1, Jan. 13, 2003.*

Limpert et al. High-power air-clad large-mode-area photonic crystal fiber laser. vol. 11, No. 7, Apr. 7, 2003.*

Limpert et al. Thermo-optical properties of air-clad photonic crystal fiber lasers in high power operation. vol. 11, No. 22, Nov. 3, 2003.*

K. Tamura et al. (1993) "77-fs pulse generation from a stretched-pulse mode-locked all-fiber ring laser", *Optics Letters* 18:1080-1082.

T. Okuno et al. (1999) "Silica Based Functional Fibers with Enhanced Nonlinearity and Their Applications", *IEEE Journal of Selected Topics of Quantum Electronics* 5:1385-1391.

G.P. Agrawal, "Nonlinear Fiber Optics," 3d edition, Academic Press, San Diego, 2001, pp. 152-155.

* cited by examiner

GENERATION OF TUNABLE LIGHT PULSES

BACKGROUND OF THE INVENTION

Applicants claim priority under 35 U.S.C. §119 of German Application Nos. 103 08 249.2 and 10 2004 009 066.1 filed Feb. 25, 2003 and Feb. 23, 2004, respectively.

1. Field of the Invention

The present invention relates to a device for the generation of tunable light pulses, having a non-linear optical fiber, by means of which the optical spectrum of femtosecond light pulses can be modified, taking advantage of solitonic effects.

2. The Prior Art

Laser systems that are able to produce femtosecond light pulses are increasingly being used in basic physical research and also in other areas of research. Using such laser systems, it is possible to observe rapid physical, chemical, and biological processes essentially in "real time." Commercial areas of use for laser systems that produce femtosecond light pulses exist in the fields of materials examination and processing, in the field of medicine, as well as in the so-called "life science" field. Concrete applications that can be mentioned as examples are multi-photon microscopy as well as optical coherence tomography.

Particularly in the field of single-photon and multi-photon microscopy, there is a need for laser systems that are both high-performance and spectrally variable, which are inexpensive and easy to operate. Until now, femtosecond light pulses having a high performance in the laboratory were usually generated by means of titanium-sapphire laser systems. It is a disadvantage of these systems that they are very expensive, complicated to adjust, and difficult to handle. Also, the spectral tunability of the generated light pulses is not satisfactory in such laser systems.

Nowadays, there is a tendency towards generating femtosecond light pulses with pulse energies of one nanojoule and more by means of purely fiber-based laser systems. Such systems usually consist of a pulsed laser light source, which emits femtosecond light pulses in the energy range of 100 picojoules. These light pulses are then amplified, by means of an optically pumped amplifier fiber, so that the light pulses are available in the desired pulse energy range.

For example, a device for generating tunable light pulses is previously known from EP 1 118 904 A1. This device works with a special non-linear optical fiber. By means of this fiber, the optical spectrum of femtosecond light pulses that are provided by a suitable pulsed laser light source can be modified, in targeted manner, taking advantage of solitonic effects. To vary the spectrum of the generated light pulses, the intensity of the light coupled into the non-linear optical fiber is varied in the system described in the cited reference. This approach directly results in the disadvantage that in the previously known system, the desired optical spectrum of the generated light pulses is dependent on the pulse energy. An independent variation of the pulse energy and the wavelength of the light pulses is therefore not possible, using the previously known system. Another disadvantage is that in the previously known system, the non-linear fiber used must have a length of several 10 m, so that the desired solitonic optical effects become active to a sufficient degree. Because of the long traveling distance, an undesirable loss of coherence of the generated light pulses can occur.

SUMMARY OF THE INVENTION

Against this background, it is an object of the present invention to provide a device for generating tunable light pulses, in which the disadvantages known from the state of the art are avoided. In particular, it is an object to generate widely tunable light pulses, whereby the pulse energy and the wavelength of the light pulses can be varied, independent of one another.

These and other objects are achieved, according to the invention, by providing a device for the generation of tunable light pulses having a non-linear optical fiber in which the non-linear optical fiber is preceded by an optical compressor.

As has been shown in the device according to the invention, non-linear processes in the fiber into which the light-pulses are coupled result in the formation of two separate light pulses in the fiber. The spectrum of these pulses is shifted towards the long-wave spectrum and the short-wave spectrum, respectively, as compared with that of the light pulse that was coupled in. In this connection, the spectral separation of the light pulses is adjustable by means of the optical compressor, which precedes the non-linear optical fiber in the device according to the invention. The temporal frequency behavior or "chirp" of the light pulses that are coupled in is influenced, in targeted manner, by the optical compressor. The optical spectrum that is modified by means of the non-linear optical fiber then depends sensitively on the predetermined "chirp," so that the desired tunability of the light pulses exists. It is particularly advantageous that the optical spectrum of the light pulses generated by means of the device according to the invention can be varied independent of the pulse energy.

Experiments have shown that the device according to the invention advantageously makes do with a very short non-linear optical fiber, having a length of only a few centimeters, to achieve the desired modification of the optical spectrum of the light pulses. In this way, coherence losses of the generated light pulses are effectively prevented.

The light pulses coupled into the non-linear optical fiber of the device according to the invention should have a pulse energy of at least one nanojoule. Such high pulse energies are desirable, so that the solitonic optical effects occur to the required degree, in order to generate the tunable light pulses within the non-linear optical fiber.

It is practical if the optical compressor of the device according to the invention is configured to be adjustable, so that the chirp of the light pulses coupled into the non-linear optical fiber is changeable. This arrangement makes it possible, in convenient and simple manner, to tune the generated light pulses to the desired wavelengths, in that the adjustable elements of the optical compressor, such as prisms or optical gratings, are adjusted in suitable manner.

According to an advantageous embodiment of the device according to the invention, the non-linear optical fiber is configured to maintain polarization and shift dispersion. Such a fiber is described, for example, in the article by T. Okuno et al. in the journal IEEE Journal of Selected Topics of Quantum Electronics, Volume 5, page 1385, 1999. The solitonic optical effects that are mentioned, which result in the desired modification of the spectrum of the light pulses according to the invention, occur in the non-linear optical fiber if the wavelength of the light pulses coupled into the fiber lies in the range of the zero dispersion wavelength of the fiber. In experiments, a non-linear optical fiber having a zero dispersion wavelength in the range of 1.52 µm was used to generate tunable light pulses, using the device according to the invention.

Light pulses having a particularly broad optical spectrum can be generated, using the device according to the invention, if the non-linear optical fiber has a particularly small diameter of ≦5 µm. In experiments, a fiber having a core diameter of 3.7 µm was successfully used, whereby a fiber length of only 7 cm proved to be sufficient. This fiber results in a usable wavelength range for tuning the light pulses, using the device according to the invention, which extends from about 1.1 µm to 2.0 µm.

In addition to conventional optical glass fibers, microstructured photonic fibers, such as photonic crystal fibers, can also be used as non-linear fibers for generating the tunable light pulses, according to the invention. Such fibers have a transverse microstructure in the region of the core. By means of suitably adapting the zero dispersion wavelength, as well as by means of low core diameters, and thereby a high level of non-linearity of such crystal fibers, it is possible to generate widely tunable light pulses according to the invention.

Optionally, in the device according to the invention, the non-linear optical fiber can be followed by an additional optical compressor, in order to achieve light pulses having a minimal pulse duration at the output of the device. In experiments, the use of a prism compressor using prisms made of SF10 glass has proven itself. It was possible to achieve pulse durations of ≦25 femtoseconds with this compressor.

In a further embodiment, an optical measurement element is provided for characterizing the light pulses modified by means of the non-linear optical fiber. Experiments have proven the use of a spectrometer as well as the known Frequency Resolved Optical Gating (FROG) structure.

BRIEF DESCRIPTION OF THE DRAWING

Other objects and features of the present invention will become apparent from the following detailed description considered in connection with the accompanying drawing. It should be understood, however, that the drawing is designed for the purpose of illustration only and not as a definition of the limits of the invention.

In the drawing,

Figure 1:
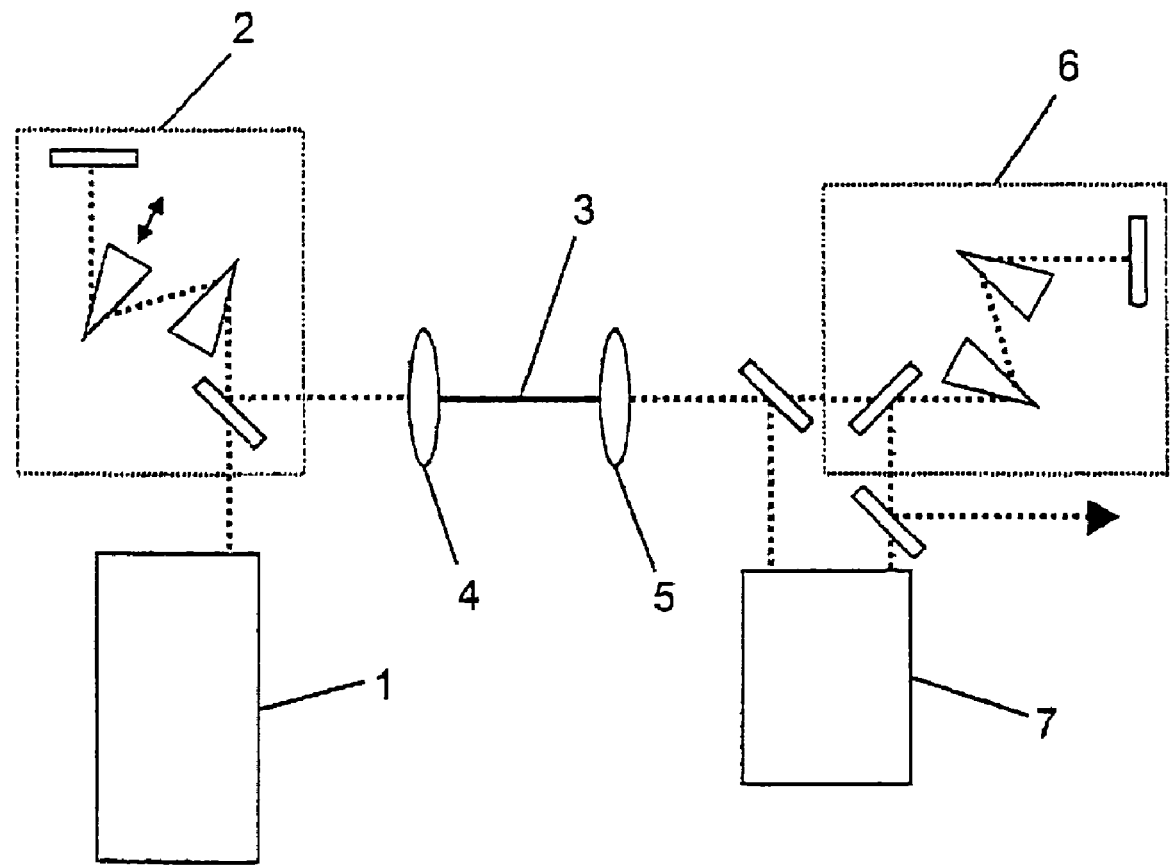

The single FIGURE FIG. 1, schematically shows an embodiment of the device according to the invention.

DETAILED DESCRIPTION OF PREFERRED EMBODIMENTS

In the structure schematically shown in FIG. 1, a pulsed laser light source 1 is provided, which emits femtosecond light pulses having a pulse energy of more than one nanojoule. It is advantageous if the laser light source is a completely fiber-based system that is composed of a commercially available pulsed fiber laser and an optical pumped amplifier fiber that follows the laser. The use of conventional free-beam lasers as laser light source 1 is also possible, however. The chirp of the light pulses emitted by laser light source 1 is adjusted, in targeted manner, by means of a prism compressor 2. In the exemplary embodiment shown, the light pulses run through the prism arrangement twice, for this purpose. The double arrow indicates that one of the prisms of the compressor is adjustable, in order to thereby be able to tune the generated light pulses, according to the invention. Prism compressor 2 is followed by a non-linear, dispersion-shifted and polarization-maintaining optical fiber 3, into which the light is coupled by means of a lens 4. The light pulses coupled into fiber 3 have a wavelength that essentially corresponds to the zero dispersion wavelength of optical fiber 3. Because of the non-linear solitonic effects that occur in fiber 3, the optical spectrum of the light pulses is severely modified. The light pulses that exit from optical fiber 3, which are coupled out by means of another lens 5, have an optical spectrum that is sensitively dependent on the "chirp" predetermined by means of compressor 2. By means of adjusting the corresponding prism in compressor 2, the light pulses that exit from fiber 3 can be adjusted in the wavelength range between 1.1 µm and 2.0 µm. As described above, the optical spectrum of the light pulses at the output of fiber 3 has two separate components, which are shifted towards the long-wave and the short-wave spectrum range, respectively, as compared with the wavelength of the light pulse that was coupled in. An adjustable spectral separation of the two components by more than 100 THz can be achieved using the structure shown. Even though a short non-linear optical fiber 3, which can have a length of ≦10 cm, is sufficient, according to the invention, the light pulses run apart, dispersively, within fiber 3. This dispersion can be compensated by means of an additional prism compressor 6. When using SF10 glass prisms, tunable light pulses having a pulse duration of ≦25 femtoseconds were implemented, using the structure shown in the drawing. To characterize the light pulses, a FROG structure or a spectrometer 7 is provided.

It should be pointed out that according to the invention, other dispersive optical components besides prism compressor 2 can also be used for a targeted adjustment of the chirp of the light pulses coupled into fiber 3, such as lattice compressors, so-called "chirped" mirrors, fiber Bregg gratings, additional dispersive optical path segments, etc., for example.

Although only at least one embodiment of the present invention have been shown and described, it is to be understood that many changes and modifications may be made thereunto without departing from the spirit and scope of the invention as defined in the appended claims.

What is claimed is:

1. A device for generating tunable light pulses comprising:
    (a) a pulse laser light source configured to produce femtosecond light pulses having an optical spectrum and a temporal frequency progression ("chirp");
    (b) an adjustable optical compressor configured to change the chirp of the light pulses output from the pulse laser light source; and
    a non-linear optical fiber configured to modify the optical spectrum of the femtosecond light pulses and for tuning the generated light pulses coupled out of the non-linear optical fiber to the desired wavelength in accordance with the chirp of the light pulses received from the adjustable optical compressor.

2. The device according to claim 1, wherein the light pulses coupled into said non-linear optical fiber have a pulse energy of at least one nanojoule.

3. The device according to claim 1, wherein said non-linear optical fiber maintains polarization or is dispersion-shifted.

4. The device according to claim 1, wherein said non-linear optical fiber has a core diameter of less than five micrometers.

5. The device according to claim 1, wherein said non-linear optical fiber comprises a microstructured photonic fiber.

6. The device according to claim 1, wherein said non-linear optical fiber has a length of less than one meter.

7. The device according to claim 1, further comprising an additional optical compressor following said non-linear optical fiber.

8. The device according to claim 1, further comprising an optical measuring instrument for characterization of the light pulses modified by means of said non-linear optical fiber.

9. A method for generating tunable light pulses, the method comprising:
(a) producing femtosecond light pulses having an optical spectrum and a temporal frequency progression ("chirp");
(b) regulating the chirp of the femtosecond light pulses;
(c) inputting the light pulses into a non-linear optical fiber in order to generate output light pulses having a modified optical spectrum due to non-linear soliton effects occurring in the optical fiber, wherein the spectrum of the output light pulses is tuned in accordance with the regulated chirp of the input light pulses.

10. A method for generating tunable light pulses, the method comprising:
(a) producing femtosecond light pulses having an optical spectrum and a temporal frequency progression ("chirp") by means of a pulse laser light source;
(b) regulating the chirp of the femtosecond light pulses by means of an optical compressor;
(c) inputting the light pulses into a non-linear optical fiber in order to generate frequency-shifted output light pulses, the frequency shift depending on the predetermined chirp of the input light pulses.

* * * * *

UNITED STATES PATENT AND TRADEMARK OFFICE
CERTIFICATE OF CORRECTION

| | | |
|---|---|---|
| PATENT NO. | : 7,218,443 B2 | Page 1 of 1 |
| APPLICATION NO. | : 10/787001 | |
| DATED | : May 15, 2007 | |
| INVENTOR(S) | : Tauser et al. | |

It is certified that error appears in the above-identified patent and that said Letters Patent is hereby corrected as shown below:

In particular, in Column 4, line 51, before "a", please insert: --(c)--.

Signed and Sealed this

Seventh Day of August, 2007

JON W. DUDAS
*Director of the United States Patent and Trademark Office*